(12) United States Patent
Weaver

(10) Patent No.: US 7,711,226 B2
(45) Date of Patent: May 4, 2010

(54) SELF-ALIGNING OPTICAL CONNECTOR SYSTEMS AND METHODS

(75) Inventor: Thomas L. Weaver, Webster Groves, MO (US)

(73) Assignee: The Boeing Company, Chicago, IL (US)

(*) Notice: Subject to any disclaimer, the term of this patent is extended or adjusted under 35 U.S.C. 154(b) by 64 days.

(21) Appl. No.: 12/190,356

(22) Filed: Aug. 12, 2008

(65) Prior Publication Data
US 2009/0116792 A1 May 7, 2009

Related U.S. Application Data

(63) Continuation of application No. 11/677,471, filed on Feb. 21, 2007, now Pat. No. 7,469,086.

(60) Provisional application No. 60/775,667, filed on Feb. 22, 2006.

(51) Int. Cl.
G02B 6/26 (2006.01)

(52) U.S. Cl. .............................. 385/52; 385/39; 385/157

(58) Field of Classification Search .................. 385/52, 385/36, 147
See application file for complete search history.

(56) References Cited

U.S. PATENT DOCUMENTS

| 4,605,281 | A | 8/1986 | Hellewell | |
| 4,807,959 | A | 2/1989 | Berkey | |
| 5,249,246 | A | 9/1993 | Szanto | |
| 5,940,558 | A * | 8/1999 | Bishop et al. | 385/52 |
| 7,505,654 | B2 * | 3/2009 | Demissy et al. | 385/52 |
| 2003/0016935 | A1 * | 1/2003 | Nakajima | 385/137 |
| 2005/0226565 | A1 * | 10/2005 | Kautio et al. | 385/52 |

OTHER PUBLICATIONS

Chen, et al., "Ultrafast Optical Switching Properties of Single-Wall Carbon Nanotube Polymer Composites at 1.55 mu/m", Applied Physics Letters, vol. 81, Issue 6, Aug. 5, 2002, pp. 975-977.
Durkop, et al., "Properties and Applications of High-Mobility Semi-conducting Nanatubes", Journal of Physics: Condensed Matter, Topical Review, IOP Publishing Ltd., vol. 16, 2004, pp. R553-R580.
Ebbesen, et al., "Electrical Conductivity of Individual Carbon Nanotubes", Nature, vol. 382, Jul. 4, 1996, pp. 54-56.

(Continued)

Primary Examiner—Ellen Kim

(57) ABSTRACT

Self-aligning optical connectors, systems, and methods for connecting optically-transmissive elements are described. In one embodiment, a connector includes a first component, a second component connected to the first component, and an optomechanical element. The optomechanical element is positioned adjacent and between said first and second components such that a portion of the optomechanical element is exposed to a leakage light when the first and second components are misaligned. The exposed portion includes a photo-sensitive material configured to at least attempt to change a dimension when exposed to the leakage light. In operation, the optomechanical element exerts an alignment force on at least one of the first and second components tending to align the first and second components when the exposed portion of the optomechanical element is exposed to the leakage light.

8 Claims, 7 Drawing Sheets

OTHER PUBLICATIONS

Kim, et al., "Effect of Electric Field on the Electronic Structures of Carbon Nanotubes", Applied Physics Letters, vol. 79, No. 8, Aug. 20, 2001, pp, 1187-1189.

Li, et al., "Nano Chemical Sensors with Polymer-Coated Carbon Nanotubes", IEEE Sensors Journal, vol. 6, No. 5, Oct. 2006, pp. 1047-1051.

Lou, et al., "Fullerene Nanotubes in Electric Fields", Physical Review B, vol. 52, No. 3, Jul. 15, 1995, 1429-1432.

Marcus, et al., "Photo-gated Carbon Nanotube FET Devices", abstract retrieved at <<http://flux.aps.org/meetings/YR04/MAR04/baps/abs/S7590003.html>>, American Physical Society annual meeting, Montreal, Quebec, Canada, Mar. 2004, 1 pg.

Peng, et al., "Carbon Nanotube Chemical and Mechanical Sensors", Conference Paper for the 3rd International Workshop on Structural Health Monitoring, 2001, pp. 1-8.

Rochefort, et al., "Switching Behavior of Semiconducting Carbon Nanotubes Under an External Electric Field", Applied Physics Letters, vol. 78, No. 17, Apr. 23, 2001, pp. 2521-2523.

Star, et al., "Starched Carbon Nanotubes", Angew. Chem. Int. Ed., vol. 41, No. 14, 2002, pp. 2508-2512.

\* cited by examiner

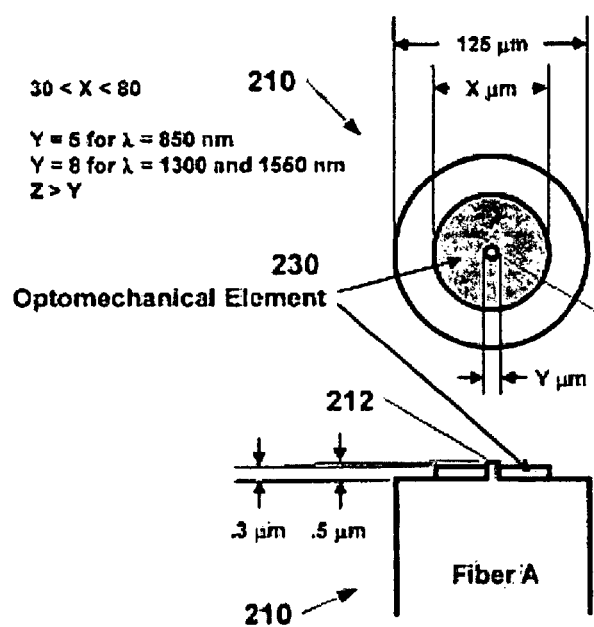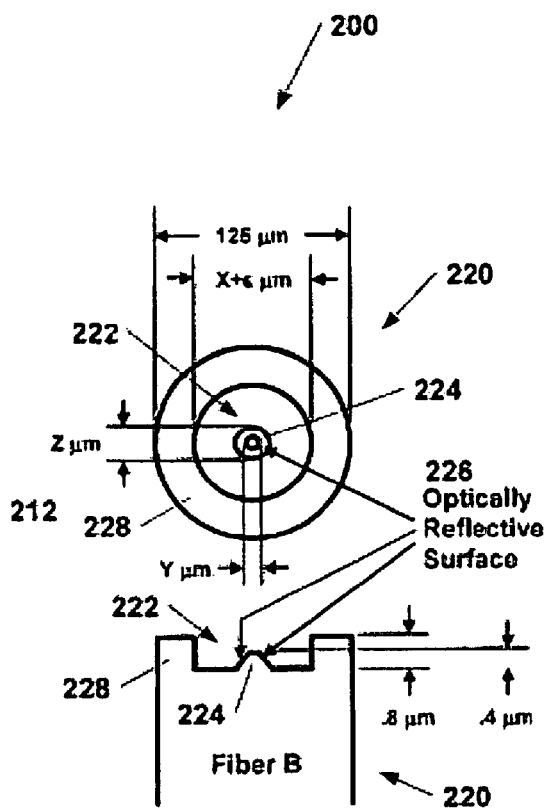
FIG. 6  FIG. 7

SELF-ALIGNING OPTICAL CONNECTOR SYSTEMS AND METHODS

CROSS REFERENCE TO RELATED APPLICATIONS

This patent application claims priority from and is a continuation of U.S. patent application Ser. No. 11/677,471 filed Feb. 21, 2007, which claims priority from U.S. Provisional Patent Application No. 60/775,667 filed Feb. 22, 2006.

FIELD OF THE DISCLOSURE

The present disclosure relates to optical connectors and, more particularly, to self-aligning optical connectors.

BACKGROUND

Fiber-optic data networks include cables through which data signals are transmitted. The cables usually include glass and transmit light signals. Adjacent fiber-optic cables in these networks are joined by connectors and must be accurately aligned to ensure the data signals properly propagate from cable to cable. Thus, the connectors must hold the cables from becoming misaligned. Keeping adjacent cables aligned is especially difficult under severe conditions. For example, aerospace applications may expose networks to vibration, contamination, and extreme temperatures. Such conditions often result in cable misalignment when conventional connectors are used. Detachment and reconnection of conventional connectors, such as during cable replacement or connector maintenance, can also lower the ability of the connectors to hold adjacent cables within desired tolerance levels.

Some fiber-optic networks require very tight tolerance connectors to ensure data signals are properly transmitted through the connectors. For example, single-mode fiber-optic networks generally require tighter tolerance connections than multimode fiber-optic networks. Fiber-optic cables generally include a cladding surrounding a central core through which data signals are transmitted. In single-mode fiber-optic networks, a single high-strength signal is transmitted generally down the center of the core. In multimode fiber-optic networks, multiple signals are simultaneously transmitted through the core.

Although some or most of the signals transmitted through the cable in a multimode network may travel along a center of the core, at least some of the signals will propagate along paths other than directly down the center. Claddings are generally made of a material having a lower index of refraction than that of the core so that signals propagating toward the cladding are refracted or bent away from the cladding. Off-center signals are refracted back and forth as they move along the cable. Multimode networks can operate with looser connection tolerances because many or most of the multiple signals being transmitted through the cables can usually pass through the connector even if some are stopped. Multimode networks produce relatively low quality output data for at least two reasons. A first reason is that because the signals move through the cable along various paths, the signals will invariably arrive at the destination at various times. Thus, the terminating sensor or device must arrange the time-spaced signals together to form the resulting data. A second reason for low quality output in multimode systems is that many of the signals may get impeded at very loose joints between adjacent cables. Therefore, even with multi-mode fiber-optic networks, quality connectors are needed to ensure proper joint alignment.

Data is generally transmitted more accurately through single-mode fiber-optic networks because terminal devices only receive one signal and, thus, do not need to piece together multiple dispersed signals to form the data. However, because only a single signal stream is transmitted, it is imperative that the signals are not impeded as they travel through the network. Accordingly, the cables must be joined together within a very tight tolerance to ensure the signals pass through the joint. Conventional connectors exist that can maintain a relatively tight tolerance connection, but only under gentle conditions. Conventional connectors also exist that can withstand severe conditions, but can only maintain a loose connection. Connectors are needed that can keep fiber-optic cables aligned within very tight tolerances under severe conditions.

SUMMARY

The present disclosure teaches self-aligning optical connectors, systems, and methods, for connecting fiber-optic cables. Embodiments in accordance with the teachings of the present disclosure may provide significant advantages over the prior art, including improved optical signal performance and reduced noise and power consumption.

In one embodiment, a self-aligning connector for connecting fiber-optic cables includes a first component connected to a first cable, a second component connected to the first component and to a second cable, and an optomechanical element. The optomechanical element is positioned adjacent and between said first component and said second component during use of the connector such that a portion of the optomechanical element is exposed to a leakage light when the first component and the second component are misaligned. The exposed portion includes a photosensitive material configured to at least attempt to change a dimension when exposed to the leakage light. In operation, the optomechanical element exerts an alignment force on at least one of the first and second components tending to align the first and second components when said exposed portion of the optomechanical element is exposed to the leakage light.

In another embodiment, a fiber-optic system includes a first cable configured to transmit light; a connector attached to the first cable and configured to transmit said light, the connector having an optomechanical element including a photosensitive material configured to at least attempt to change a dimension when exposed to light; and a second cable attached to said connector opposite said first cable and configured to transmit said light, wherein the optomechanical element is configured to exert an alignment force on at least one of the first and second cables when exposed to a leakage light emanating from at least one of the first and second cables, the alignment force tending to urge the first and second cables into alignment.

In a further embodiment, a method of using optically-transmissive elements includes: providing a first component operatively coupled to a first optically-transmissive element; providing a second component operatively coupled to a second optically-transmissive element; providing an optomechanical element including a photosensitive material configured to at least attempt to change a dimension when exposed to light; coupling the optomechanical element and the first and second components such that the optomechanical element is at least partially disposed between the first and second components; transmitting light through at least one of the first and second optically-transmissive elements; exposing a portion of the optomechanical element to a leakage portion of the transmitted light at least when the first and second optically-transmissive elements are misaligned; and while exposing the portion of the optomechanical element, exerting an alignment force on at least one of the first and second optically-transmissive elements using the optomechanical element, the alignment force tending to urge the first and second optically-transmissive elements into alignment.

The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

FIGS. 6 and 7 show side and end elevational views of first and second components, respectively, of a connector in accordance with another embodiment of the disclosure.

Corresponding reference characters indicate corresponding parts throughout the several views of the drawings.

DETAILED DESCRIPTION

Figure 1:
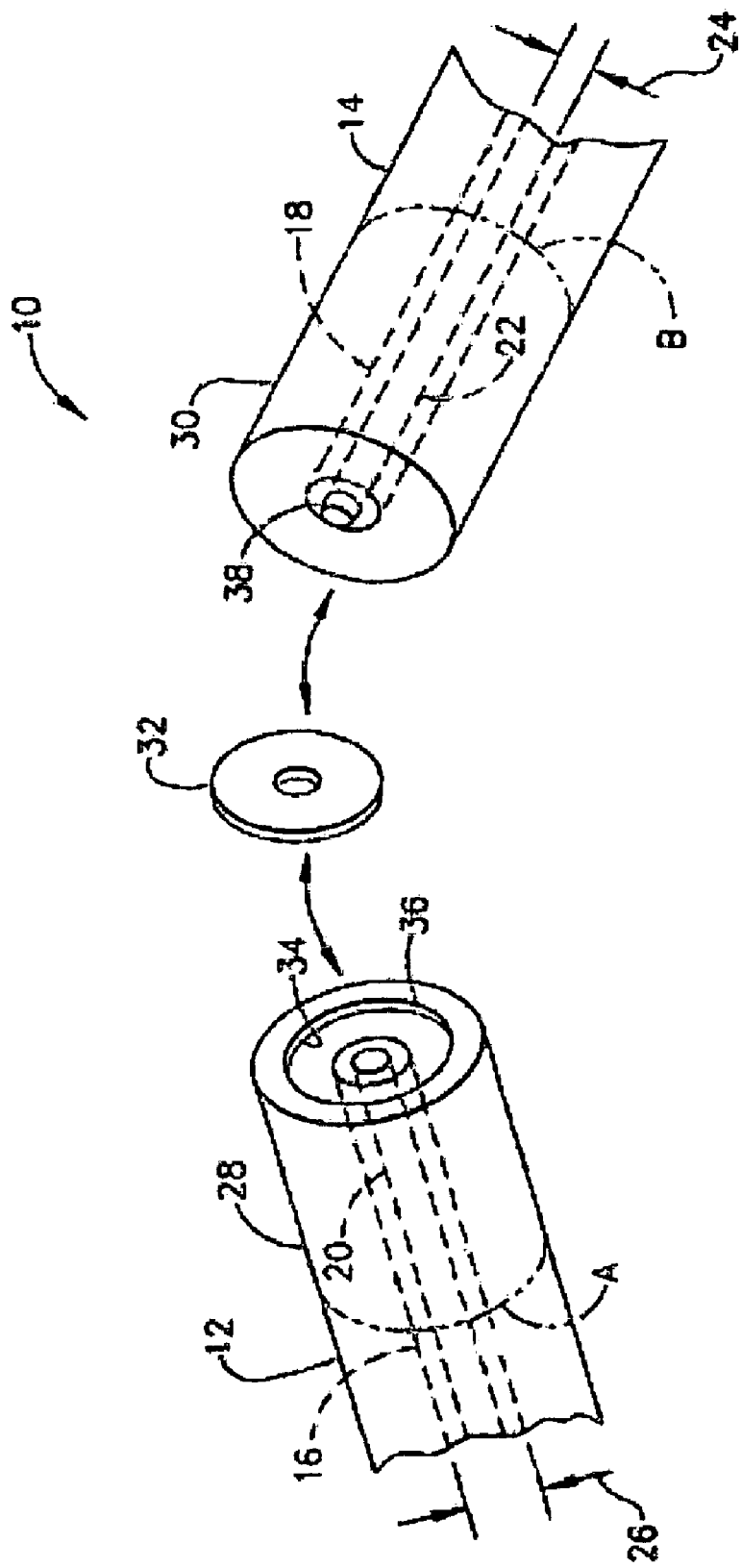
FIG. 1 is a perspective of a self-aligning connector according to the present disclosure.

Referring to the figures, and more particularly to FIG. 1, a self-aligning optical connector according to the present disclosure is designated in its entirety by reference number 10. The connector 10 joins two adjacent cables 12, 14. Each cable 12, 14 has a cladding 16, 18 surrounding a core 20, 22 through which light signals (not shown) are transmitted. The claddings 16, 18 and cores 20, 22 may be made of various materials. In one embodiment, each cladding 16, 18 is made of a material having a lower index of refraction than an index of refraction of a material the corresponding core 20, 22 is made of. As will be appreciated by those skilled in the art, a higher index of refraction core 20, 22 keeps the light signals within the core 20, 22 because signals propagating to the cladding 16, 18 at less than a critical angle with respect to an interface between the cladding 16 and the core 20, 22 will be refracted or bent back toward the core 20, 22. Although the claddings 16, 18 and cores 20, 22 may have other indexes of refraction, in one embodiment the cores 20, 22 have an index of refraction of between about 1.46 and about 1.48 and the claddings 16, 18 have an index of refraction of between about 1.44 and about 1.46. The claddings 16, 18 and cores 20, 22 may include glass. In one embodiment, each core 20, 22 includes doped glass, such as glass doped with germanium. Although the cores 20, 22 may have other diameters, in one embodiment each core 20, 22 has a diameter 24 of between about 3 micrometers and about 10 micrometers. Although the claddings 16, 18 may have other outer diameters 26, in one embodiment each cladding 16, 18 has an outer diameter of between about 15 micrometers and about 80 micrometers.

The connector 10 includes a first component 28, a second component 30, and an optomechanical element 32 positioned adjacent and between the components 28, 30 when the connector is assembled. The optomechanical element 32 includes a photosensitive material having at least two states, a first state in which the material is generally stiff and substantially maintains its shape and dimensions and a second state in which the material is generally compliant and changes a dimension when exposed to a light. In some embodiments, the material of the optomechanical element 32 changes shape when it is in its second state and exposed to light. In other embodiments, the material of the optomechanical element 32 may be compliant in the first state, and may become generally stiff in the second state after exposure to the light. Although the material of the optomechanical element 32 may change from its first state to its second state in response to other stimuli, in one embodiment the material changes from its first state to its second state when the material is exposed to a controlling or transforming fluid (not shown).

The first component 28 is connected to a first cable 12 of the two fiber-optic cables and the second component 30 is connected to a second cable 14 of the two cables. The components 28, 30 are joined to connect the cables 12, 14 during use of the connector 10. The first and second components 28, 30 may be formed integrally with or separately from their corresponding cables 12, 14. That is, the first component 28 may be formed as an integral end of the first cable 12 or formed separately from the first cable 12 and then attached thereto. For example, when formed separately, the first component 28 can be attached to the first cable 12 at a first attachment interface, designated by dashed line "A". Likewise, the second component 30 may be formed as an integral end of the second cable 14 or formed separately from the second cable 14 and then connected thereto. For example, when formed separately, the second component 30 can be attached to the second cable 14 at a second attachment interface, designated by dashed line "B". In one embodiment, one of the first and second components 28, is formed as an integral part of its corresponding cable 12, 14 and the other component 30, 28 is formed separately from and later connected to the other cable 14, 12.

Components 28, 30 formed separately from the corresponding cable 12, 14 may be attached to the cables in various ways. For example, it is contemplated that separately formed components 28, 30 may be bonded (not shown) to the cable 12, 14. It is also contemplated that separately formed components 28, 30 have shapes that compliment shapes of the cables 12, 14 so the connector 10 and the cable can be secured together using the complimentary shapes. For example, the components 28, 30 and cables 12, 14 can have complimentary threads for screwing one into the other for attachment.

The first component 28 includes a recess 34 having an edge 36 and the second component 30 includes a projection 38. The recess 34 and the projection 38 may be formed in various ways. For example, the recess 34 and the projection 38 may be formed by chemical etching or mechanical abrasion. In one embodiment, at least some of a surface of each component 28, 30 is polished to ensure a smooth fit between the first component 28, the second component 30, and the optomechanical element 32 and allow signals to propagate better through the connector 10.

The recess 34 and the projection 38 may have various shapes and dimensions. In one embodiment, the recess 34 and the projection 38 are generally circular or round. Although the recess 34 may have other diameters 40 (shown in FIG. 2), in one embodiment the recess 34 has a diameter of between about 30 micrometers and about 80 micrometers. Although the projection 38 may have other diameters 42, in one embodiment the projection 38 has a diameter that tapers between a minimum of between about 3 micrometers and about 7 micrometers adjacent a top 44 (shown in FIG. 3) of the projection 38 and maximum of between about 6 micrometers and about 10 micrometers adjacent a bottom 46 of the projection 38. In one embodiment, the projection 38 has a height 48 that is slightly greater than a depth 50 of the recess 34 to ensure that the projection 38 contacts a bottom 52 of the recess 34 when the connector 10 is assembled. For example, in one embodiment, the projection 38 is about 0.1 micrometer taller than the depth 50 of the recess 34. Although the projection 38 may have other heights 48, in one embodiment the projection 38 has a height of between about 0.3 micrometer and about 0.7 micrometer. For example, in a particular embodiment, the projection 38 has a height of about 0.5 micrometer. Although the recess 34 may have other depths 50, in one embodiment the recess 34 has a depth of between about 0.2 micrometer and about 0.6 micrometer. In a particular embodiment, the recess 34 has a depth 50 of about 0.4 micrometer.

Figure 2:
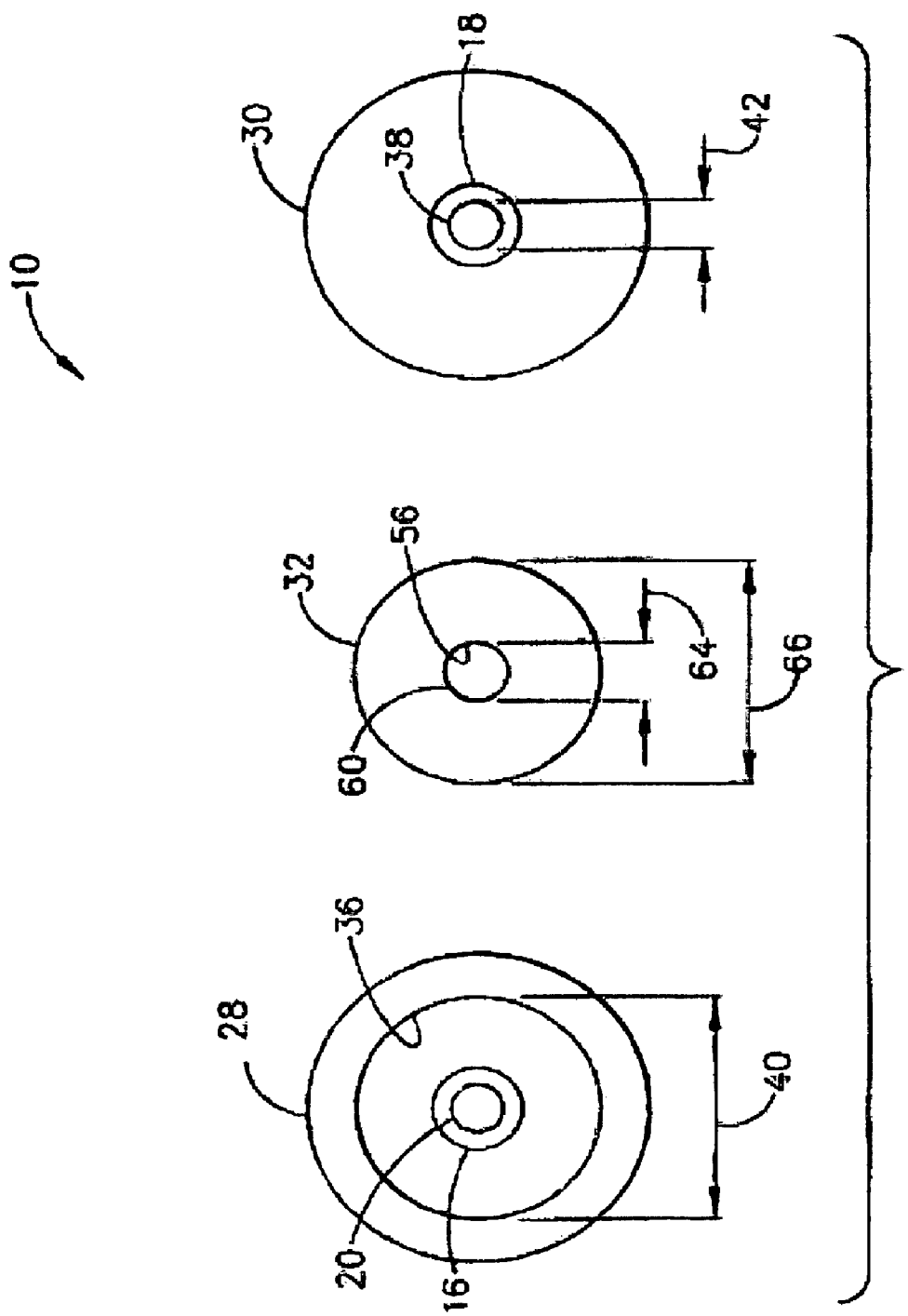
FIG. 2 is a plan view of a first component, an electromechanical element, and a second component of the connector embodiment of FIG. 1.
Figure 3:
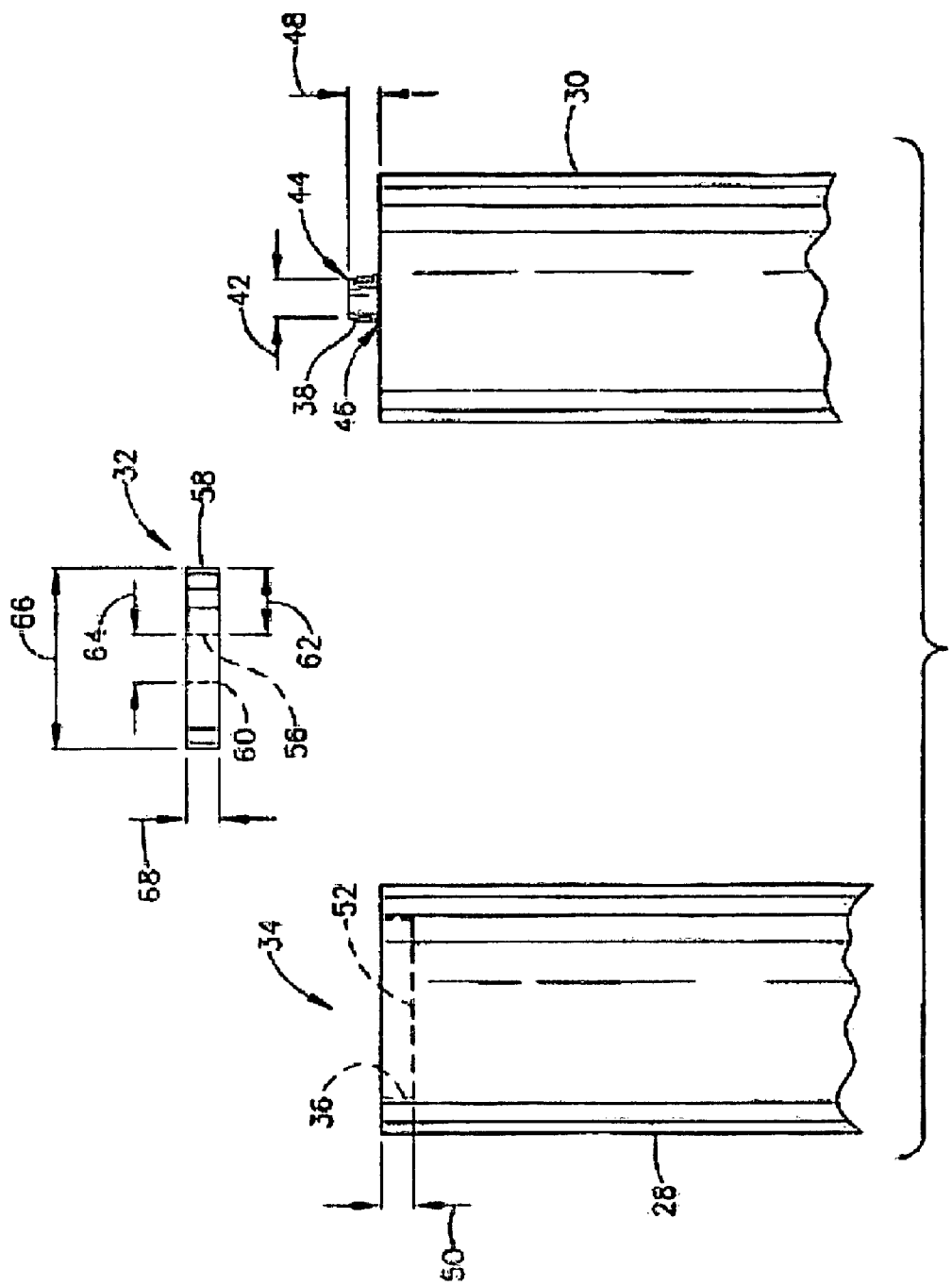
FIG. 3 is a side view of the first component, the electromechanical element, and the second component of the connector embodiment of FIG. 1.
Figure 4:
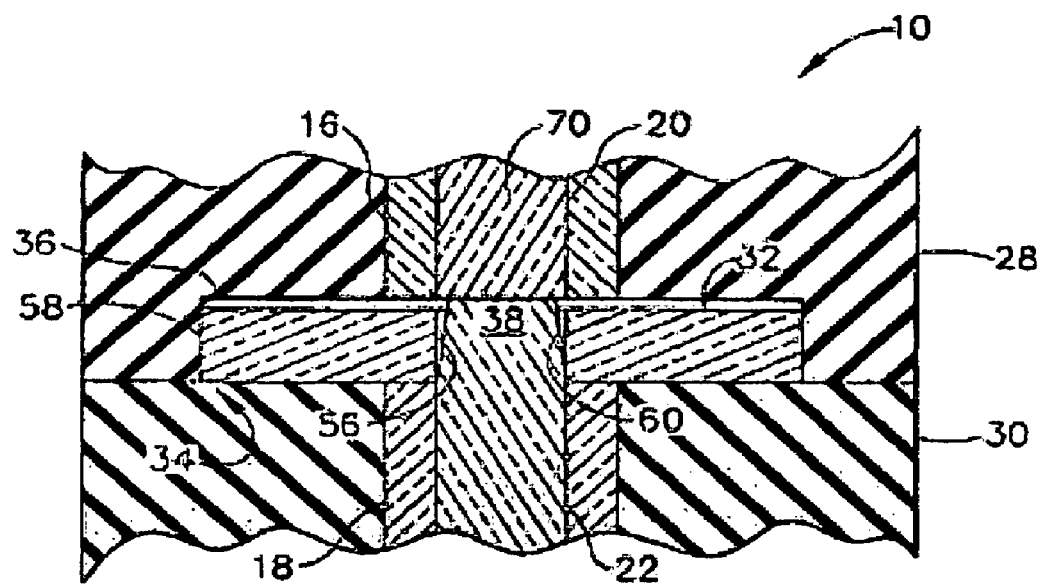
FIG. 4 is a side cross section of the connector embodiment of FIG. 1.

As best shown in FIG. 2, the optomechanical element 32 has a cavity 56 and a periphery 58 and the cavity 56 has an outer rim 60. The optomechanical element 32 has a radial thickness 62 extending between the cavity 56 and the periphery 58. As shown in FIG. 4, the cavity 56 of the element 32 is positioned around the projection 38 of the second component 30 and the periphery 58 of the element 32 is positioned adjacent the edge 36 of the first component 28 when the connector 10 is assembled. The cavity 56 and the periphery 58 of the optomechanical element 32 have dimensions and shapes corresponding to the shapes of the projection 38 and recess 34, respectively. Thus, in one embodiment, the cavity 56 and periphery 58 are generally circular. Although the optomechanical element 32 may have other dimensions, in one embodiment the element cavity 56 has a diameter 64 (shown in FIG. 3) of between about 3 micrometers and about 10 micrometers, the element periphery 58 has a diameter 66 of between about 30 micrometers and about 80 micrometers, and the element 32 has a longitudinal thickness 68 of between about 0.2 micrometer and about 0.4 micrometers.

Although the optomechanical element 32 may be made of other materials, in one embodiment the element 32 includes nanotubes embedded in a material matrix (not shown in detail). Nanotubes are two-dimensional crystalline sheets of atoms that have been rolled up and connected at a seam to form a closed cylinder. For example, carbon nanotubes are hexagonally shaped arrangements of carbon atoms that have been rolled into tubes. The element 32 may include more than one type of nanotube. Some types of nanotubes have been found to change dimensions and/or shape in response to stimulus, such as light. For example, carbon nanotubes have been found to decrease in size when exposed to light. As will be appreciated by those skilled in the art, when many sensitive nanotubes are embedded in a compliant matrix, the entire matrix will change a dimension and/or shape as the individual nanotubes change dimension and/or shape. A reaction that the optomechanical element 32 has to a stimulus depends on a type or types of nanotubes used, a number of nanotubes used, a ratio of the nanotubes to the amount of matrix material used, a distribution of the nanotubes in the material matrix, and a type of material matrix used. In one embodiment, the element 32 includes millions of photosensitive carbon nanotubes embedded in a polymer such as a soft plastic.

As described above, in this embodiment, the material of the optomechanical element 32 has at least two states, a first state in which the material is stiff and substantially maintains its shape and dimensions and a second state in which the material is compliant and changes a dimension and/or a shape when exposed to a light. The material of the optomechanical element 32 changes back to its second state after the stimulus that caused it to change to the second state is removed and the effect of the stimulus wears off. For example, in an embodiment where the stimulus for transforming the element 32 from its first state to its second state is a fluid, the element 32 may return to its first state after the element 32 is not being exposed to the transforming fluid and the fluid evaporates from the element 32. In other embodiments, the optomechanical element 32 changes from the first state to the second state in response to an electric field, a magnetic field, or heat. Although the optomechanical element 32 may remain in its second state for other amounts of time after exposure to the transforming stimulus (e.g., transforming fluid) is removed, in one embodiment the element 32 remains in its second state for between about 20 and about 120 seconds.

As will be appreciated by those skilled in the art, the particular material used as the matrix of the optomechanical element 32 and the particular changing or transforming stimulus may be selected through experimentation. Considerations for selecting a matrix material and transforming stimulus include how stiff the matrix material will be when it is in its first state, an amount of time it takes the material to change states when exposed to the stimulus, how compliant the material will be when it is in its second state, and how much time the material will remain in its second state after the stimulus is removed.

A temporary change from the first state to the second state allows a user to change a size and/or a dimension of the optomechanical element 32 as desired while the element 32 is in its second state and have the element 32 maintain the desired shape and dimensions after the element 32 returns to the first state. In an embodiment where the fiber-optic connector 10 is used in an aircraft (not shown), the optomechanical element 32 may be made of a material that does not change shape or dimensions when exposed to fluids commonly used during aircraft manufacture and maintenance, such as water, alcohol, hydraulic fluid, and jet fuel. In embodiments where the transforming stimulus is a fluid, a particular chemical or chemicals used as the transforming fluid may be selected through experimentation. In one embodiment, the transforming fluid is a chemical that can be mixed with a fluid used to clean the fiber-optic cables 12, 14 and connector 10 when the cables 12, 14 are being connected during fiber-optic cable system formation or maintenance. In this way, the optomechanical element 32 can be changed from its first state to its second state during a usual step in a fiber-optic system preparation process.

Assembling the connector 10 includes positioning the optomechanical element 32 between the first component 28 and the second component 30. Steps for assembling the connector 10 can be performed in various orders. For embodiments where the connector components 28, 30 are formed separately from the cables 12, 14, the connector 10 may be assembled before or after the components 28, 30 are connected to the cables 12, 14. For example, the components 28, 30 and optomechanical element 32 can be assembled and then attached to the cables 12, 14. Alternatively, the components 28, 30 can be attached to the cables 12, 14 before assembling the connector 10. Further, the connector 10 can be partially assembled and then attached to the cables 12, 14. For embodiments where the connector components 28, 30 are integral parts of the respective cables 12, 14, the components 28, 30 are attached together with the optomechanical element 32 between them. In these embodiments, the optomechanical element 32 may be attached to the first component 28 and then to the second component 30 or attached to the second component 30 first and then to the first component 28.

Positioning the optomechanical element 32 adjacent the first component 28 includes positioning the element in the recess 34 of the first component 28. The element 32 is positioned in the recess 34 so the periphery 58 of the element 32 is disposed adjacent the edge 36 of the recess 34. Positioning the element 32 adjacent the second component 32 includes positioning the cavity 56 of the element 32 around the projection 38 of the second component 30. Because connector 10 operation depends on interaction between the element 32 and the components 28, 30, it is important to ensure contact between them. Specifically, the rim 60 of the cavity 56 should firmly contact the projection 38 and the periphery 58 should firmly contact the edge 36 of the recess 34. In one embodiment, the periphery 58 of the optomechanical element 32 continuously contacts the edge 36 of the second component 30 around the entire recess 34 and the rim 60 of the optomechanical element 32 contacts the projection 38 continuously around the projection 38. The tapered design of the projection 38 of the second component 30 ensures a tight connection between the element 32 and the second component 30. Specifically, the element 32 and the projection 38 are sized and shaped so the element 32 becomes increasingly snug against the projection 38 as the element 32 is slid down around the projection 38.

One manner to ensure a snug fit between the optomechanical element 32 and the components 28, 30 is to temporarily contract or shrink the element 32 during formation of the connector 10. More specifically, in the embodiment shown in FIGS. 1-3, the optomechanical element 32 shrinks when it is in its second state and exposed to light to which it is sensitive. The element 32 may be shrunk and positioned as desired adjacent the components 28, 30 in any order. For example, in one embodiment, the optomechanical element 32 is positioned around the projection 38 of the second component 30, shrunk, and positioned within the recess 34 of the first component 28, in this order. The light used for shrinking the optomechanical element 32 may be produced by, for example, a portable light source (not shown) that can easily be moved around a manufacturing area and outdoors for use. In one embodiment, the optomechanical element 32 is sensitive to visible light such as sunlight when it is in its second state. In one embodiment, the optomechanical element 32 is sensitive to infra-red light.

After the optomechanical element 32 is changed to its second state, contracted by the preshrinking light, and positioned in the recess 34, the element 32 naturally expands to fit tightly against the edge 36 of the recess 34 after the light is removed while the element 32 is still in its second state. The amount of time it takes for the optomechanical element 32 to return to its default dimensions may depend on many variables. For example, the amount of time it takes for the element 32 to return to its default dimensions may depend on the type of photosensitive material used, an amount of transforming stimulus (e.g., transforming fluid) to which the element 32 is exposed, the type of light applied, and an amount of exposure the element 32 has to the preshrinking light. The tightly fitting optomechanical element 32 is said to be preloaded in the connector 10 because the element 32 will be applying a load against the components 28, 30 after the element 32 expands in the connector 10.

Whether the first and/or second components 28, 30 are integral to or formed separately from the corresponding cables 12, 14, the cables 12, 14 are connected together using a fastening system (not shown). The fastening system may include fasteners conventionally used to connect fiber-optic cables. As will be appreciated by those skilled in the art, a ferrule-type fastener including springs that allow the first and second components 28, 30 to touch can be used to secure the cables 12, 14 together.

Figure 5A:
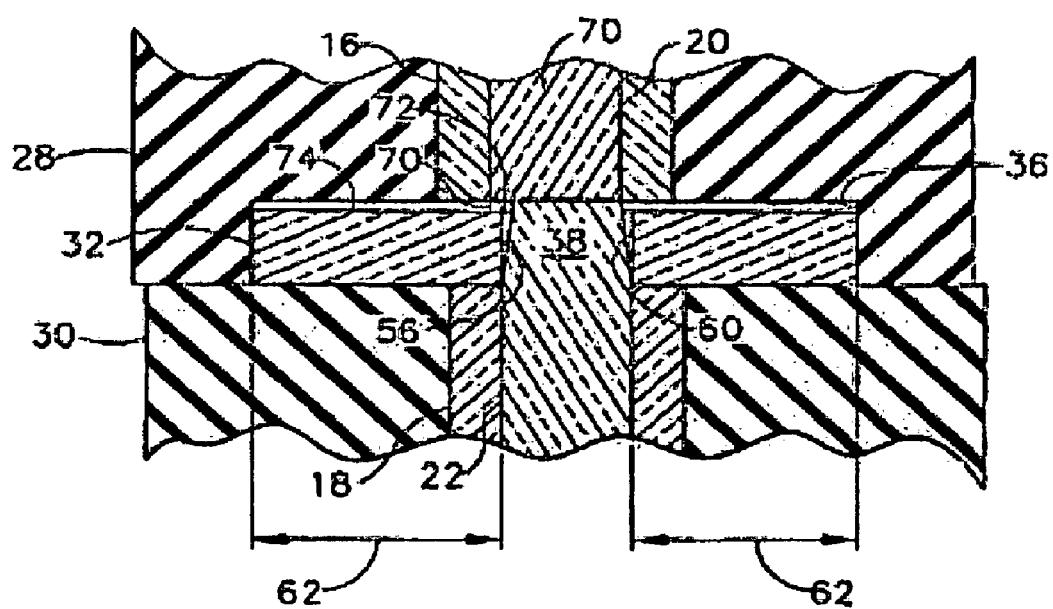
FIG. 5A is a side cross section of the connector embodiment of FIG. 1 when it is misaligned.
Figure 5B:
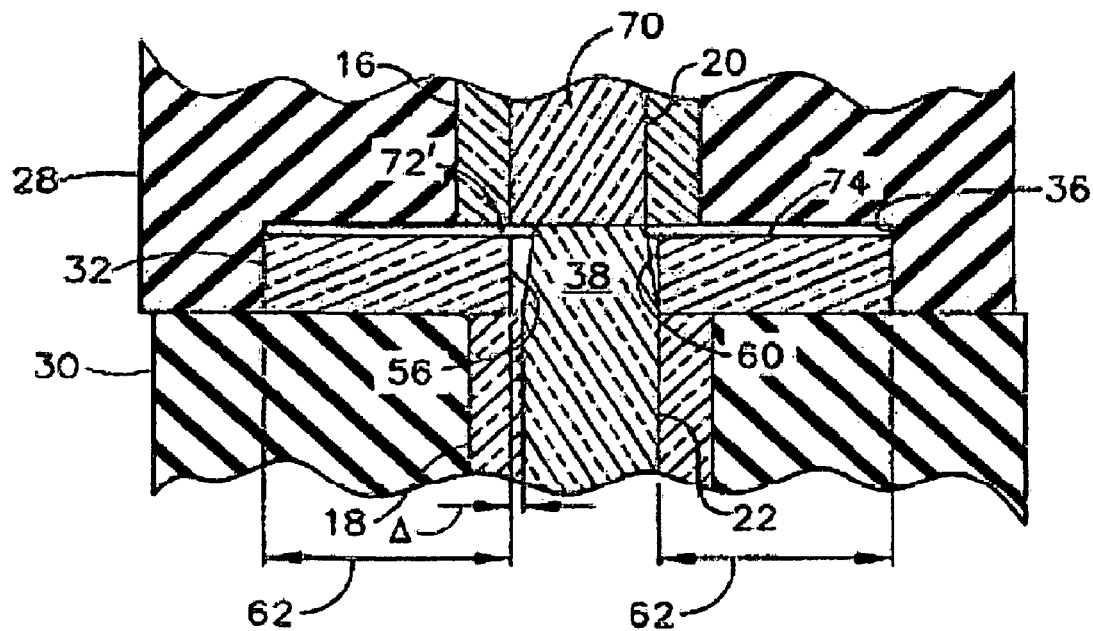
FIG. 5B is a side cross section of the connector embodiment of FIG. 1 while it is aligning itself.
Figure 5C:
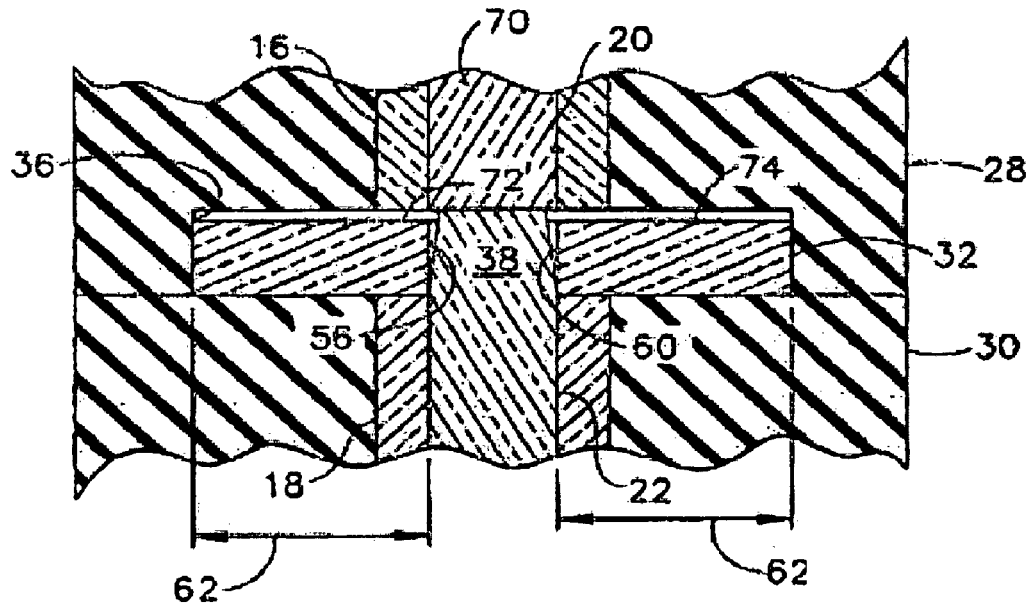
FIG. 5C is a side cross section of the connector embodiment of FIG. 1 after it has aligned itself.

An assembled connector 10 includes a path 70 through which the light can travel when being transmitted from the first cable 12 to the second cable 14. The light path 70 is generally coextensive with the core 20 of the first cable 12 because the light propagates to the connector 10 from that core 20. As shown in FIG. 5A, the connector 10 is configured so that a portion 72 of the optomechanical element 32 protrudes into the light path 70 passing through the connector 10 when the first component 28 and the second component 30 of the connector 10 are misaligned. When the connector components 28, 30 are misaligned, the cable cores 20, 22 are not aligned and light passing through the connector 10 will contact the protruding portion 72 of the optomechanical element 32. When the optomechanical element 32 is in its second state and the protrusion 72 is exposed to light, the element 32 changes a dimension and/or shape. Specifically, as shown in FIGS. 5A and 5B, when the optomechanical element 32 is in its second state and the protrusion 72 is exposed to light, the radial thickness 62 of the element 32 adjacent the protrusion 72 decreases by an amount Δ proportional to an amount the element 32 is exposed to the light. Because the element 32 is preloaded against the edge 36 of the recess 34 and the projection 38 and the element 32 is in its second, compliant state, a decrease in the radial thickness 62 at one portion of the element 32, such as at the protruding portion 72, results in an increase in radial thickness at a portion 74 of the element 32 that is opposite the first portion 72. As shown in FIGS. 5B and 5C, as the protruding portion 72 decreases in size and the opposite portion 74 increases in size, the opposite portion 74 pushes the projection 38 towards the portion 72' that was protruding. In this way, the optomechanical element 32 changes a dimension and/or shape when it is in its second state and exposed to light to move the second component 30 with respect to the first component 28 to align the connector 10 and, thereby, align the cables 12, 14. Cable 12, 14 alignment is maintained by the optomechanical element 32 when the element 32 changes back to its first state and stiffens.

It will be appreciated that a variety of alternate embodiments may be conceived in accordance with the teachings of the present disclosure, and that the disclosure is not limited to the particular embodiments described above. For example, FIGS. 6 and 7 show end elevational and side cross-sectional views of first and second components 210, 220, respectively, of a connector 200 in accordance with another embodiment of the disclosure. In this embodiment, the optomechanical element 230 is formed of a material that expands in response to exposure to light. As shown in FIG. 6, the optomechanical element 230 is positioned on a projection 212 that extends outwardly from the first component 210. Representative dimensions of exemplary embodiments of the first and second components 210, 220 and the optomechanical element 230 are shown on FIGS. 6 and 7 for illustrative purposes, and it will be appreciated that in various alternate embodiments, other dimensions may be used.

In this embodiment, a recess 222 is formed within an end portion of the second component 220, creating a retaining rim 228 that serves to contain the optomechanical element 230 when the first and second components 210, 220 are coupled. As shown in FIG. 7, a tapered portion 224 projects outwardly from the second component 220 within an approximately central portion of the recess 222. The tapered portion 224 includes an optically reflective surface 226.

Figure 8:
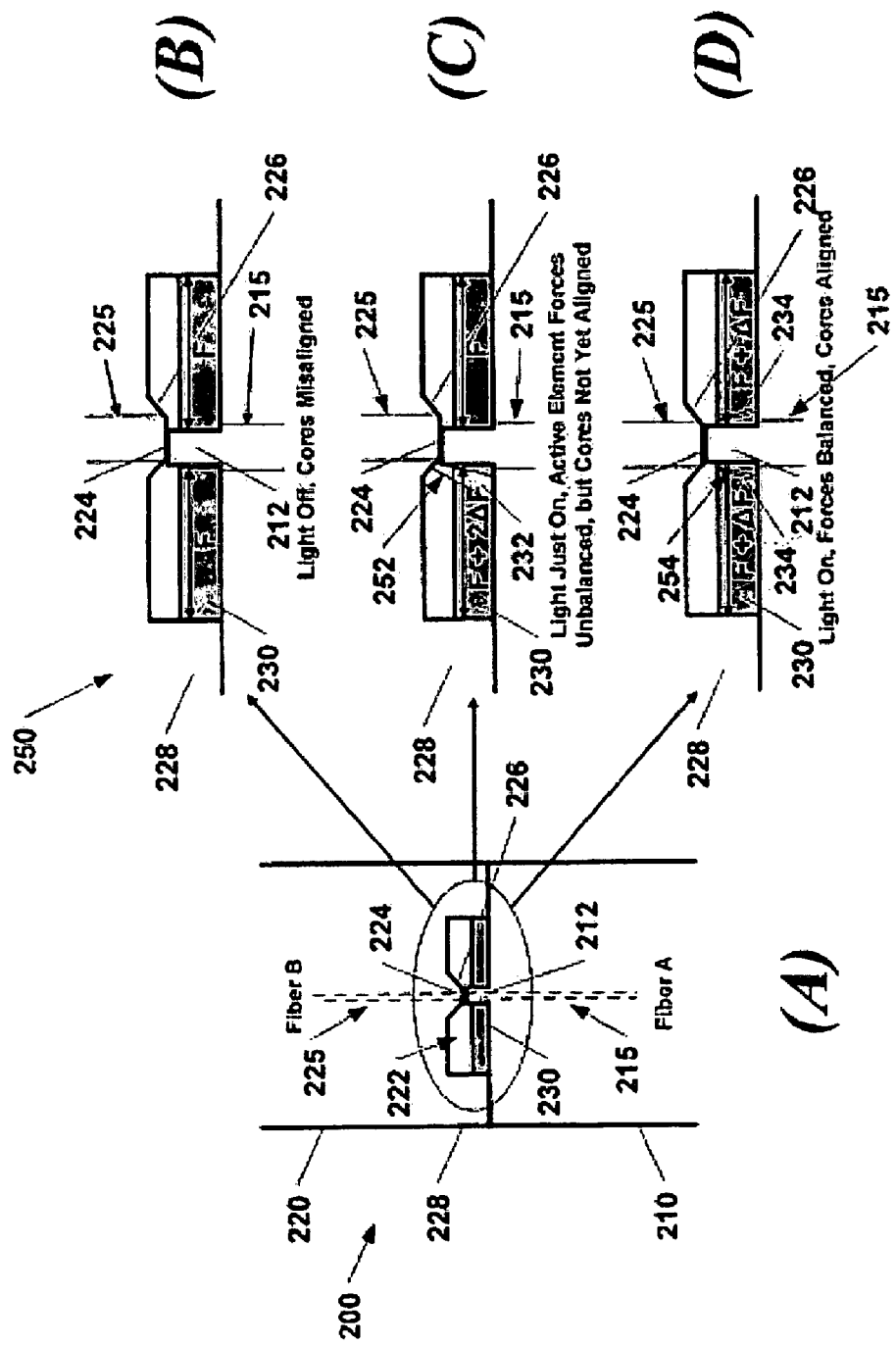
FIG. 8 shows the connector of FIGS. 6 and 7 in a coupled condition, as well as in various stages of a self-aligning process in accordance with another alternate embodiment of the disclosure.

FIG. 8 shows the connector 200 of FIGS. 6 and 7 in a coupled condition (A), as well as various stages (B), (C), (D) of a self-aligning process 250. In the coupled condition (A), the first and second components 210, 220 are engaged such that the optomechanical element 230 is disposed around the projection 212 of the first component 210, and disposed within the recess 222 of the second component 220. Further, an outer perimeter of the optomechanical element 230 is engaged against the retaining rim 228, and the tapered portion 224 of the second component 220 is adjacent to (or abuts with) the projection 212 of the first component 210.

In a first stage (B) of the self-aligning process 250, a first fiber (or core) 215 of the first component 210 is misaligned with a second fiber (or core) 225 of the second component 220. As shown in FIG. 8, in the first stage (B), the first and second components 210, 220 are coupled and the optomechanical element 230 may have an approximately constant radial extent F extending radially outwardly on both sides of the projection 212. In the first stage (B), however, the first and second fibers 215, 225 are at least somewhat misaligned.

In a second stage (C) of the self-aligning process 250, light is transmitted along the first fiber 215. Due to the misalignment of the first and second fibers 215, 225, a portion 252 of the light is reflected from the reflective surface 226 of the tapered portion 224 of the second component 220. The reflected light portion 252 emanates away from the tapered portion 224 and impinges on the optomechanical element 230, causing an exposed portion 232 of the optomechanical element 230 to transition to a second stage in which the exposed portion 232 expands. Because the optomechanical element 230 is confined within the retaining rim 228, the expansion of the exposed portion 232 exerts an aligning force on the projection 212 that urges the projection 212 and the embedded first fiber 215 toward an improved alignment with the tapered portion 224 and the embedded second fiber 225.

In a third stage (D), the first and second fibers 215, 225 have reached an aligned (or acceptably aligned) condition such that the light transmitted through the first fiber 215 enters the second fiber 225 without any reflections from the reflective surface 226. With no reflected light impinging on the optomechanical element 230, the optomechanical element 230 returns to its non-stimulated state and ceases expansion, causing the first and second fibers 215, 225 to remain in the aligned condition. Alternately, as shown in FIG. 8, in the third stage (D), a nominal portion 254 of the light may be reflected from the reflective surface 226 even when the first and second fibers 215, 225 are in the aligned (or acceptably aligned) condition. In this case, nominally exposed portions 234 of the optomechanical element 230 may remain in a state of expansion, and the expansion forces created by the nominally exposed portions 234 may become approximately balanced. Thus, in the third stage (D), the forces exerted on the projection 212 by the optomechanical element 230 may reach an equilibrium that maintains the first and second fibers 215, 225 in the acceptably aligned condition.

Throughout this disclosure, when introducing elements of embodiments, the articles "a", "an", "the", and "said" are intended to mean that there are one or more of the elements. The terms "comprising", "including", and "having" are intended to be inclusive and mean that there may be additional elements other than the listed elements.

While specific embodiments have been illustrated and described herein, as noted above, many changes can be made without departing from the spirit and scope of the disclosure. Accordingly, the scope of the disclosure should not be limited by the specific embodiments set forth above, but rather determined by reference to the claims that follow.

What is claimed is:

1. A method of using optically-transmissive elements, comprising:

providing a first component operatively coupled to a first optically-transmissive element;

providing a second component operatively coupled to a second optically-transmissive element;

providing an optomechanical element including a photosensitive material configured to at least attempt to change a dimension when exposed to light;

coupling the optomechanical element and the first and second components such that the optomechanical element is at least partially disposed between the first and second components;

transmitting light through at least one of the first and second optically-transmissive elements;

exposing a portion of the optomechanical element to a leakage portion of the transmitted light at least when the first and second optically-transmissive elements are misaligned; and while exposing the portion of the optomechanical element, exerting an alignment force on at least one of the first and second optically-transmissive elements using the optomechanical element, the alignment force tending to urge the first and second optically-transmissive elements into alignment.

2. The method of claim 1 wherein exposing a portion of the optomechanical element to a leakage portion of the transmitted light includes directly impinging the leakage portion on a protruding portion of the optomechanical element that protrudes into a light path between the first and second optically-transmissive elements.

3. The method of claim 2 wherein exerting an alignment force on at least one of the first and second optically-transmissive elements using the optomechanical element includes at least attempting to contract the protruding portion of the optomechanical element.

4. The method of claim 2 wherein exerting an alignment force on at least one of the first and second optically-transmissive elements using the optomechanical element includes contracting the protruding portion of the optomechanical element and expanding another portion of the optomechanical element.

5. The method of claim 1 wherein exposing a portion of the optomechanical element to a leakage portion of the transmitted light includes indirectly impinging the leakage portion on an exposed portion of the optomechanical element by reflecting the leakage portion from a reflective surface disposed on at least one of the first and second optically-transmissive elements.

6. The method of claim 5 wherein exerting an alignment force on at least one of the first and second optically-transmissive elements using the optomechanical element includes at least attempting to expand the exposed portion of the optomechanical element.

7. The method of claim 1 wherein coupling the optomechanical element and the first and second components includes disposing the optomechanical element about a projection extending outwardly from the first component, and disposing the optomechanical element within a recess having a retaining rim formed within the second component, the optomechanical element being disposed between the projection of the first component and the retaining rim of the second component, and wherein exerting an alignment force on at least one of the first and second optically-transmissive elements using the optomechanical element includes at least one of attempting to contract and attempting to expand the exposed portion of the optomechanical element to apply the alignment force on at least one of the projection and the retaining rim.

8. The method of claim 1 wherein coupling the optomechanical element and the first and second components includes coupling the first and second components using a fastener.

* * * * *